United States Patent
Gao et al.

(10) Patent No.: US 10,552,988 B2
(45) Date of Patent: Feb. 4, 2020

(54) ORDERING SEGMENTS OF AN IMAGE FOR ENCODING AND TRANSMISSION TO A DISPLAY DEVICE

(71) Applicant: Intel Corporation, Santa Clara, CA (US)

(72) Inventors: Jie Gao, Sunnyvale, CA (US); Manish Hiranandani, Fremont, CA (US); Atsuo Kuwahara, Portland, OR (US); Ulun Karacaoglu, San Diego, CA (US); Yaniv Frishman, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/852,991

(22) Filed: Dec. 22, 2017

(65) Prior Publication Data

US 2019/0043223 A1  Feb. 7, 2019

(51) Int. Cl.
G06K 9/36 (2006.01)
G06T 9/20 (2006.01)

(52) U.S. Cl.
CPC ...................... *G06T 9/20* (2013.01)

(58) Field of Classification Search
CPC ...... G06T 9/20; H04N 18/174; H04N 19/189; H04N 19/436; H04N 19/70; H04N 19/172; G06F 15/7867
See application file for complete search history.

(56) References Cited

U.S. PATENT DOCUMENTS

| | | | | |
|---|---|---|---|---|
| 4,345,245 A | * | 8/1982 | Vella | B41B 19/01 345/25 |
| 4,405,942 A | * | 9/1983 | Block | H04N 7/1696 348/E7.059 |
| 4,649,419 A | * | 3/1987 | Arragon | G06F 7/584 348/E7.056 |
| 4,710,717 A | * | 12/1987 | Pelc | G01R 33/56325 324/309 |
| 5,764,808 A | * | 6/1998 | O'Connell | G06T 9/20 375/E7.081 |
| 7,518,614 B2 | * | 4/2009 | Emerson | G06F 3/1454 345/502 |
| 8,014,588 B2 | * | 9/2011 | Rudin | G06T 7/593 382/154 |

(Continued)

Primary Examiner — Amir Alavi
(74) Attorney, Agent, or Firm — Hanley, Flight & Zimmerman, LLC

(57) ABSTRACT

Methods, apparatus, systems and articles of manufacture are disclosed to order a plurality of segments of an image for encoding and wireless transmission to a display device. The apparatus includes a segment orderer to arrange the segments in an encoding order for encoding. The encoding order is different than a scan line order, and encoding order is such that a center segment of the plurality of segments is to occupy a first position in the encoding order. The first position precedes a second position occupied by the center segment in the scan line order and the center segment corresponds to a center of the image. The apparatus also includes an encoder to encode the segments in the encoding order, and a wireless transmitter to transmit the encoded portions to the display device in the encoding order in which the encoded segments are encoded.

27 Claims, 12 Drawing Sheets

(56) References Cited

U.S. PATENT DOCUMENTS

| | | | |
|---|---|---|---|
| 8,254,707 B2* | 8/2012 | Fukuhara | H04N 19/139 375/240.11 |
| 9,596,477 B2* | 3/2017 | Chou | H04N 19/436 |
| 2009/0074077 A1* | 3/2009 | Lakus-Becker | H04N 19/105 375/240.25 |
| 2019/0043223 A1* | 2/2019 | Gao | G06T 9/20 |

* cited by examiner

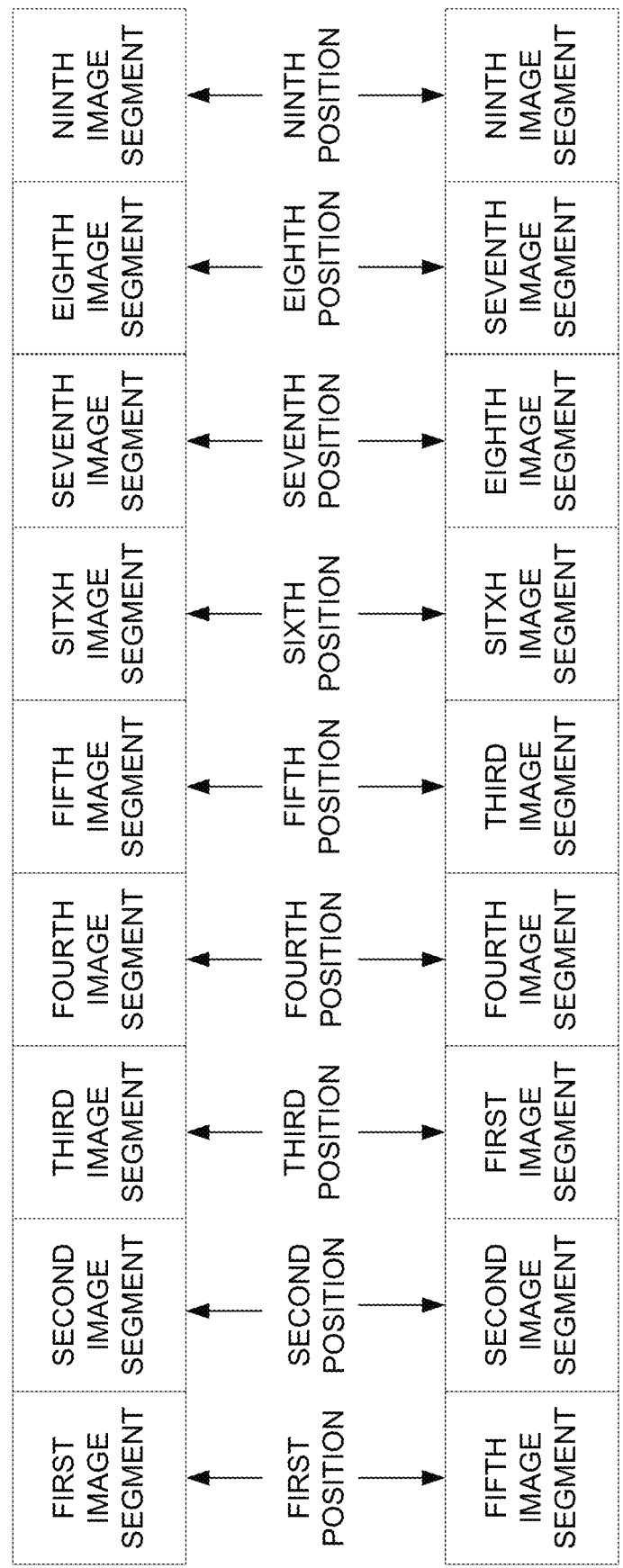

| | | | | | | | | | |
|---|---|---|---|---|---|---|---|---|---|
| 510 | FIRST IMAGE SEGMENT | SECOND IMAGE SEGMENT | THIRD IMAGE SEGMENT | FOURTH IMAGE SEGMENT | FIFTH IMAGE SEGMENT | SIXTH IMAGE SEGMENT | SEVENTH IMAGE SEGMENT | EIGHTH IMAGE SEGMENT | NINTH IMAGE SEGMENT |
| 520 | FIFTH IMAGE SEGMENT | SECOND IMAGE SEGMENT | FIRST IMAGE SEGMENT | FOURTH IMAGE SEGMENT | THIRD IMAGE SEGMENT | SIXTH IMAGE SEGMENT | EIGHTH IMAGE SEGMENT | SEVENTH IMAGE SEGMENT | NINTH IMAGE SEGMENT |
| 530 | $4t_0$ | $0t_0$ | $-2t_0$ | $0t_0$ | $-2t_0$ | $0t_0$ | $1t_0$ | $-1t_0$ | $0t_0$ |

FIG. 5

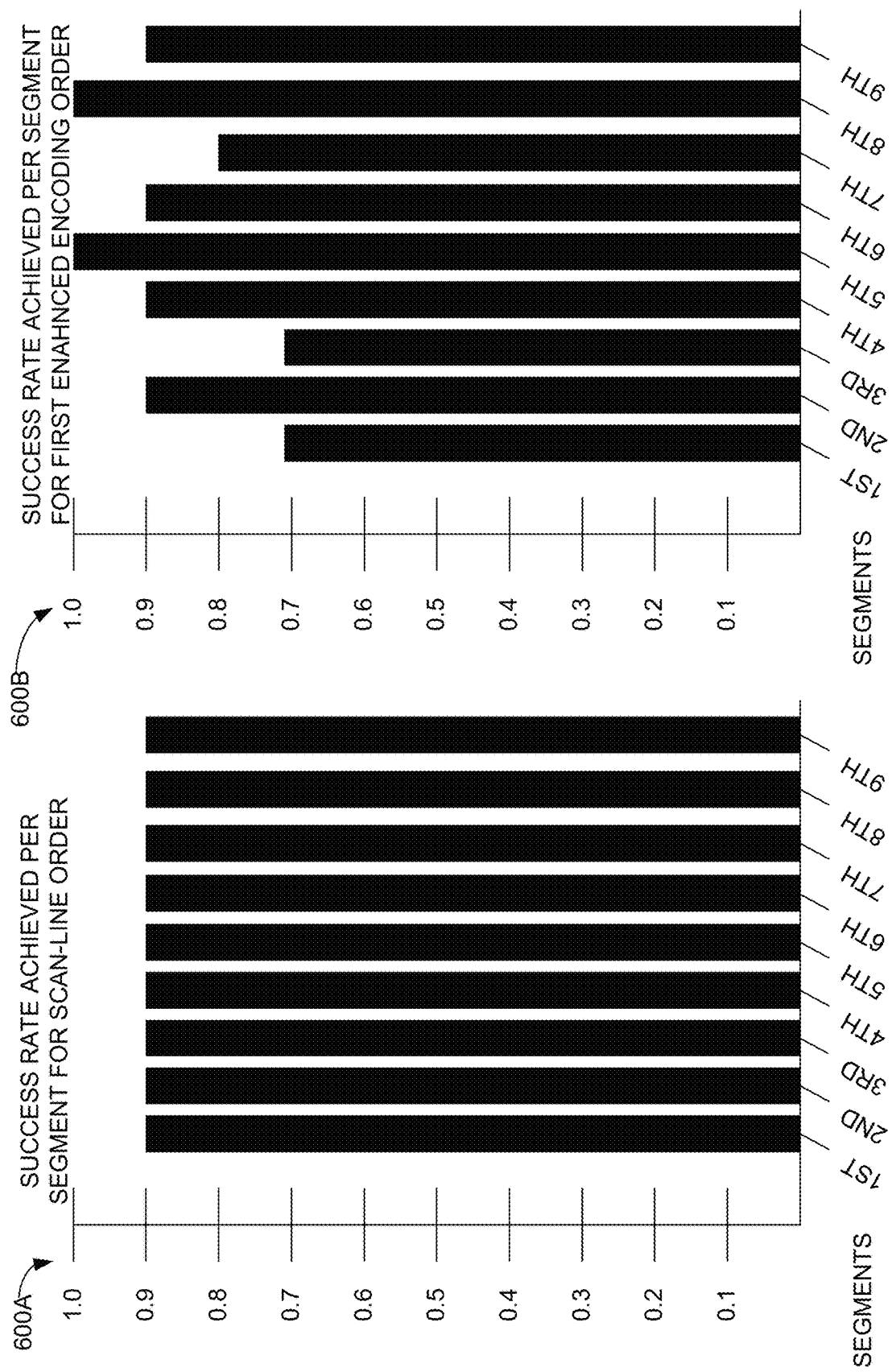

FIG. 7

| SECOND IMAGE SEGMENT | FIRST IMAGE SEGMENT | FIFTH IMAGE SEGMENT | THIRD IMAGE SEGMENT | FOURTH IMAGE SEGMENT | SIXTH IMAGE SEGMENT | EIGHTH IMAGE SEGMENT | SEVENTH IMAGE SEGMENT | NINTH IMAGE SEGMENT |
|---|---|---|---|---|---|---|---|---|
| ↓ | ↓ | ↓ | ↓ | ↓ | ↓ | ↓ | ↓ | ↓ |
| FIRST POSITION | SECOND POSITION | THIRD POSITION | FOURTH POSITION | FIFTH POSITION | SIXTH POSITION | SEVENTH POSITION | EIGHTH POSITION | NINTH POSITION |

| 810 | 820 | 830 |
|---|---|---|
| FIRST IMAGE SEGMENT | SECOND IMAGE SEGMENT | $1t_0$ |
| SECOND IMAGE SEGMENT | FIRST IMAGE SEGMENT | $-1t_0$ |
| THIRD IMAGE SEGMENT | FIFTH IMAGE SEGMENT | $2t_0$ |
| FOURTH IMAGE SEGMENT | THIRD IMAGE SEGMENT | $-1t_0$ |
| FIFTH IMAGE SEGMENT | FOURTH IMAGE SEGMENT | $-1t_0$ |
| SIXTH IMAGE SEGMENT | SIXTH IMAGE SEGMENT | $0t_0$ |
| SEVENTH IMAGE SEGMENT | EIGHTH IMAGE SEGMENT | $1t_0$ |
| EIGHTH IMAGE SEGMENT | SEVENTH IMAGE SEGMENT | $-1t_0$ |
| NINTH IMAGE SEGMENT | NINTH IMAGE SEGMENT | $0t_0$ |

ORDERING SEGMENTS OF AN IMAGE FOR ENCODING AND TRANSMISSION TO A DISPLAY DEVICE

FIELD OF THE DISCLOSURE

This disclosure relates generally to virtual reality systems and, more particularly, to ordering segments of an image for encoding and transmission to a display device.

BACKGROUND

Recent advancements in virtual reality technologies have resulted in virtual reality systems that offer greatly improved user experiences. As a result, virtual reality systems are becoming ever more popular and are soon expected to be a staple of household entertainment systems, theme park attractions, job-related training tools, educational methods, etc.

BRIEF DESCRIPTION OF THE DRAWINGS

FIG. 4A is an example image segment queue containing image segments arranged in a scan line order.

FIG. 4B is an example image segment queue containing image segments arranged in a first enhanced encoding order.

FIG. 5 is a table illustrating a scan line decoding order, the example first enhanced encoding order, and a difference in time periods between the encoding of each image segment and the decoding of each image segment.

FIG. 6A is a graph illustrating an example decoding success rate achieved for each image segment when a scan line encoding order is used.

FIG. 6B is a graph illustrating an example decoding success rate achieved for each image segment when the first enhanced encoding order is used to encode/transmit the image segments.

FIG. 7 is an example image segment queue containing image segments arranged in a second enhanced encoding order.

FIG. 8 is a table illustrating a scan line decoding order, the example second enhanced encoding order, and a difference in time periods between the encoding of each image segment and the decoding of each image segment.

The figures are not to scale. In general, the same reference numbers will be used throughout the drawing(s) and accompanying written description to refer to the same or like parts.

DETAILED DESCRIPTION

Figure 1:
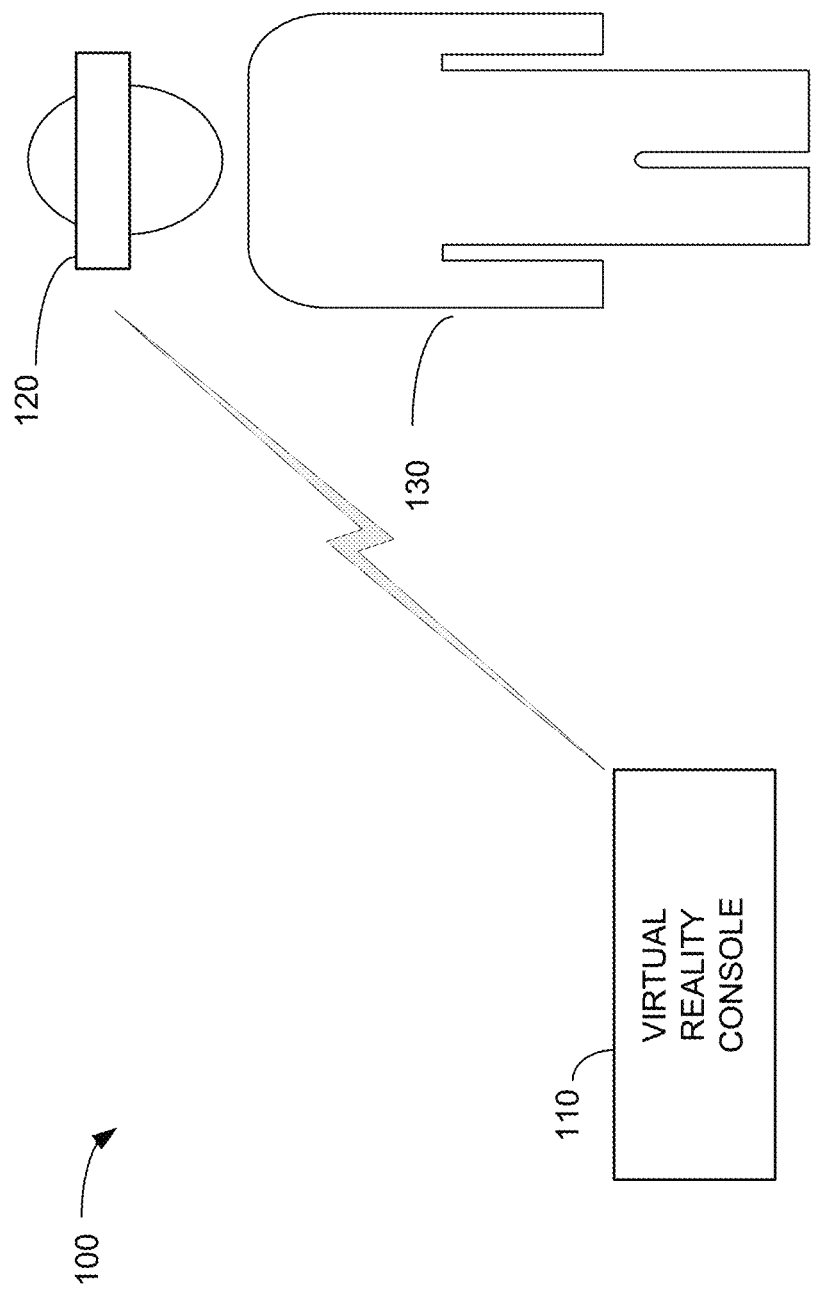
FIG. 1 illustrates an example virtual reality system including an example virtual reality console to order segments of an image for encoding and transmission to an example head mounted display of the virtual reality system in accordance with teachings of this disclosure.

Virtual reality systems are predicted to become a home entertainment staple as recent advancements in the underlying technology have greatly improved the user's experience. In current wireless virtual reality systems, a virtual reality console communicates via a wireless link with a head mounted display worn by a user. Information transmitted via the wireless link includes images that, when displayed on a screen of the head mounted display, give the user/wearer the illusion of occupying a virtual reality.

In conventional virtual reality systems, the bandwidth/goodput of the wireless link by which the virtual reality console communicates with the head-mounted display dynamically changes as the orientation of the head-mounted display changes. Thus, as the user's/wearer's head moves, the orientation of the head-mounted display changes and the quality of the wireless link changes. Unfortunately, in some instances, the changes in orientation cause the quality of the wireless link to degrade sufficiently to cause the delivery of image data to be adversely affected. In some cases, one or more segments/regions/portions of an image frame to be displayed at the head-mounted display are dropped during delivery, and/or the delivery of one or more image frames is delayed. A decoder of the head-mounted display unit decodes the received image segments to render the image frame (also referred to as the image) on the head-mounted display. When an image segment corresponding to a current image is dropped or received too late to be timely decoded, the decoder causes image data from a corresponding image segment of a previously displayed image to be rendered on the display. Additionally, or alternatively, one or more other error-mitigation, error handling algorithms can be used to compensate for the absent image segment. Although such error-correction/mitigation techniques help mitigate the adverse effects caused by the dropped or delayed image segments, the dropped/delayed segments can still cause an adverse effect on the user experience. In some such instances, images rendered using currently and previously transmitted image segments can have artifacts that are discernible by the human eye and serve to impair the illusion of the virtual reality experience. Thus, there is an on-going need to improve the manner in which image segments are encoded/delivered to the head-mounted display unit.

The virtual reality technology disclosed herein greatly improves the throughput of a wireless link between a virtual reality console and a head-mounted display by arranging the image segments in a non-scan line order for encoding and transmission. In conventional systems, an image to be transmitted from the console to the head mounted display is segmented/partitioned into smaller segments (also referred to herein as portions, regions, parts partitions, etc.). The segmenting/partitioning results in the image being divided into a set of rows that are further divided into columns thereby forming a grid of image segments. The image segments are numbered beginning at the top row and each segment in the top row is assigned a number proceeding from left to right until the end of the top (first) row is reached. Next, the numbering picks up again at the left-most segment of the second row. Numbering proceeds in this manner (row by row, from top to bottom, and from left to right within a row) until all of the image segments have been assigned a number. This is referred to herein as a scan line order/ordering of the image segments as the image segments are ordered in the manner in which the image is scanned (e.g., top to bottom, and left to right). Thus, in an image divided into nine segments contained in three rows and three columns, the three segments of the top row are numbered one, two, and three from left to right. The three segments of the second row are numbered four, five, and six from left to right, and the three segments of the third row are numbered seven, eight, and nine from left to right.

In conventional virtual reality systems, the numbered segments are encoded (and then transmitted) in scan line order, e.g., segment 1 is encoded first followed by segments 2, 3, 4, 5, 6, 7, 8 and, lastly, segment 9. The encoded segments are also transmitted by the virtual reality console to the head-mounted display in scan line order, e.g., from 1-9.

However, the center of an image is typically more important to the user visually as it holds the user's gaze. Moreover, the content fidelity is greatest at the center of the image due to the design of a lens included in head-mounted displays. Thus, in the example nine segment image above, image segment 5, containing content located at the center of the image, is more important to the integrity of the image displayed at the head-mounted display unit than the other image segments. Yet, as explained above, in a conventional virtual reality system, segment 5 is encoded and communicated to the head-mounted display after segments 1, 2, 3, and 4.

As mentioned above, head movement by the user/wearer of the head-mounted display unit changes the orientation of the head-mounted display unit thereby causing the condition of the wireless link to degrade. In some instances, the re-orientation of the head-mounted display unit will trigger a beam forming operation through which a wireless transmitter of the virtual reality console attempts to realign a wireless beam by which the wireless link communicates with the head-mounted display unit. As a result, the transmitter of the virtual reality console halts transmission of image segments until the beam is realigned. This transmission halting operation can last a few milliseconds thereby delaying delivery of the image segments. Unfortunately, the delay resulting from the beam realignment can cause one or more of the image segments to arrive at a decoder of the head-mounted display unit too late which, in turn, can result in image segment delivery failure. Further, with reference to the example nine segment image above, as image segment 5 contains content that is at the center of the image, an image segment delivery failure of image segment 5 can have a greater impact on the integrity of the resulting image that is rendered at the head-mounted display unit than delivery failure of other segments.

The virtual reality system disclosed herein improves the user experience by enabling the display of richer, higher quality image/video content. The display of richer, higher quality image/video content is enabled by arranging the image segments in a non scan line order for encoding and transmission to the head-mounted display. In some examples, the image segments are ordered in a manner that provides the image segments having center image content a greater amount of time to reach the head-mounted display unit. As such, there is a greater likelihood that the higher priority image segments containing more important image content are received at the head-mounted display (e.g., are not dropped) and are received in an amount of time sufficient to permit decoding (e.g., without impermissible delay). As a result, the images rendered by the head-mounted display of the disclosed virtual reality system are less glitchy and provide the user with a richer, and more realistic, virtual reality experience.

The technologies disclosed herein are applicable not only to virtual reality systems but also to mixed reality and augmented reality systems. Indeed the technologies disclosed herein can be used to improve any system that wirelessly transports images/image segments to a remote display unit.

FIG. 1 is an example implementation of an example virtual reality system 100 including an example virtual reality console 110 that wirelessly communicates with an example virtual reality head-mounted display 120 worn by a user 130. In some examples, the virtual reality console 110 wirelessly transmits image data to the head-mounted display 120 which uses the image data to render a corresponding image for viewing by the user 130.

Figure 2:
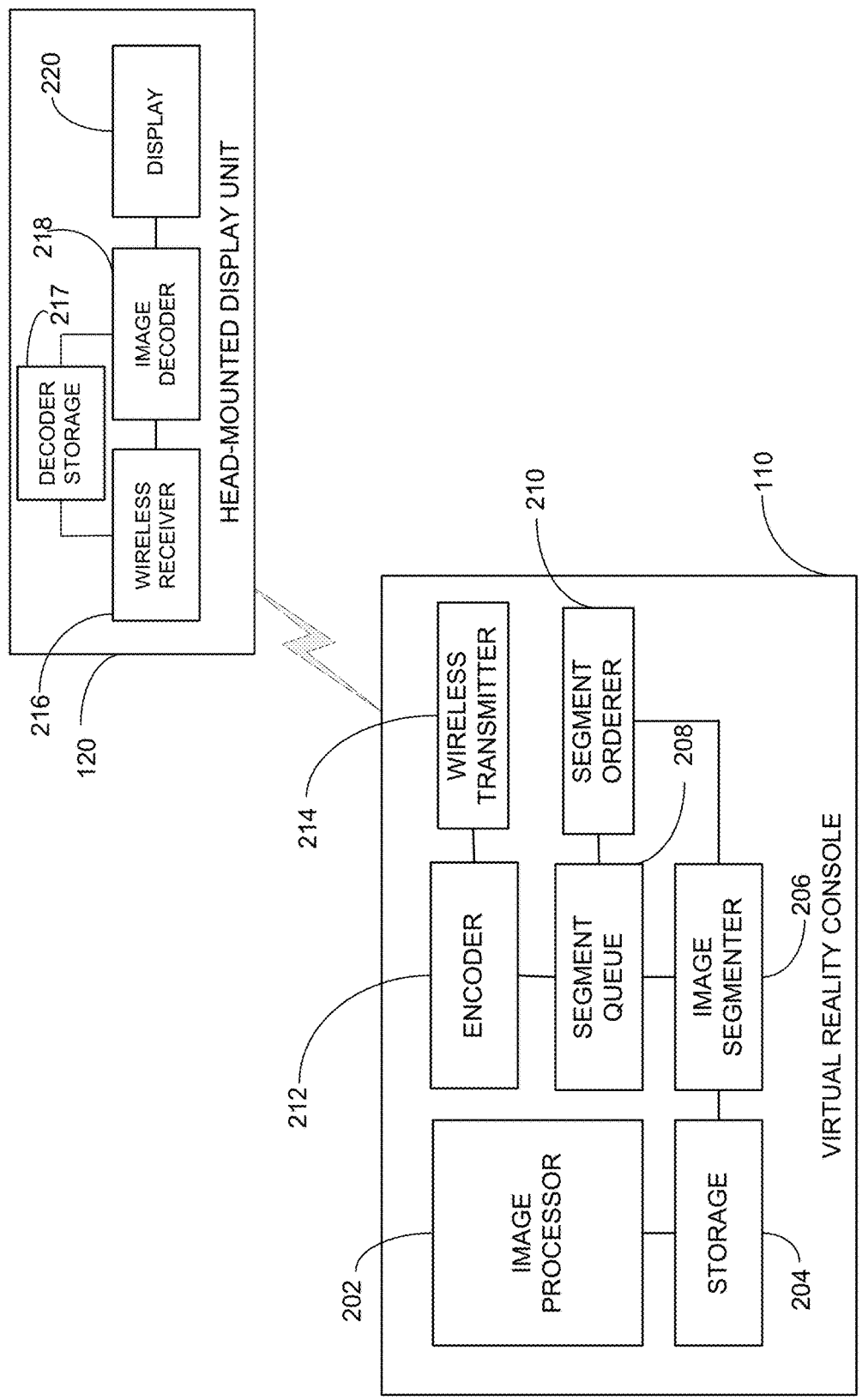
FIG. 2 is a block diagram of the example virtual reality console of FIG. 1 and the example head-mounted display unit of FIG. 1.

FIG. 2 is a block diagram of an example implementation of the example virtual reality console 110 and the example head-mounted display unit 120 of FIG. 1. In some examples, the virtual reality console 110 includes an example image processor 202 in communication with example storage (e.g., memory) 204 storing software instructions and/or image/video data, an example segmenter 206, an example segment queue 208, and example segment orderer 210, an example encoder 212, and an example wireless transmitter 214. In some examples, the example head-mounted display unit 120 includes an example wireless receiver 216, example decoder storage 217, an example decoder 218, and an example display/screen/lens 220 on which images are rendered.

In some examples, the example image processor 202 processes, generates and/or selects an image frame to be delivered to the head-mounted display 120 for rendering thereat. In some examples, the image processor 202 identifies, to the example image segmenter 206, a location in the example storage 204 at which the image frame is stored. The image segmenter 206 responds to the location information by segmenting/dividing/partitioning the image frame into a set of image segments (also referred to herein as image portions, image regions, image parts, image tiles, etc.).

Figure 3:
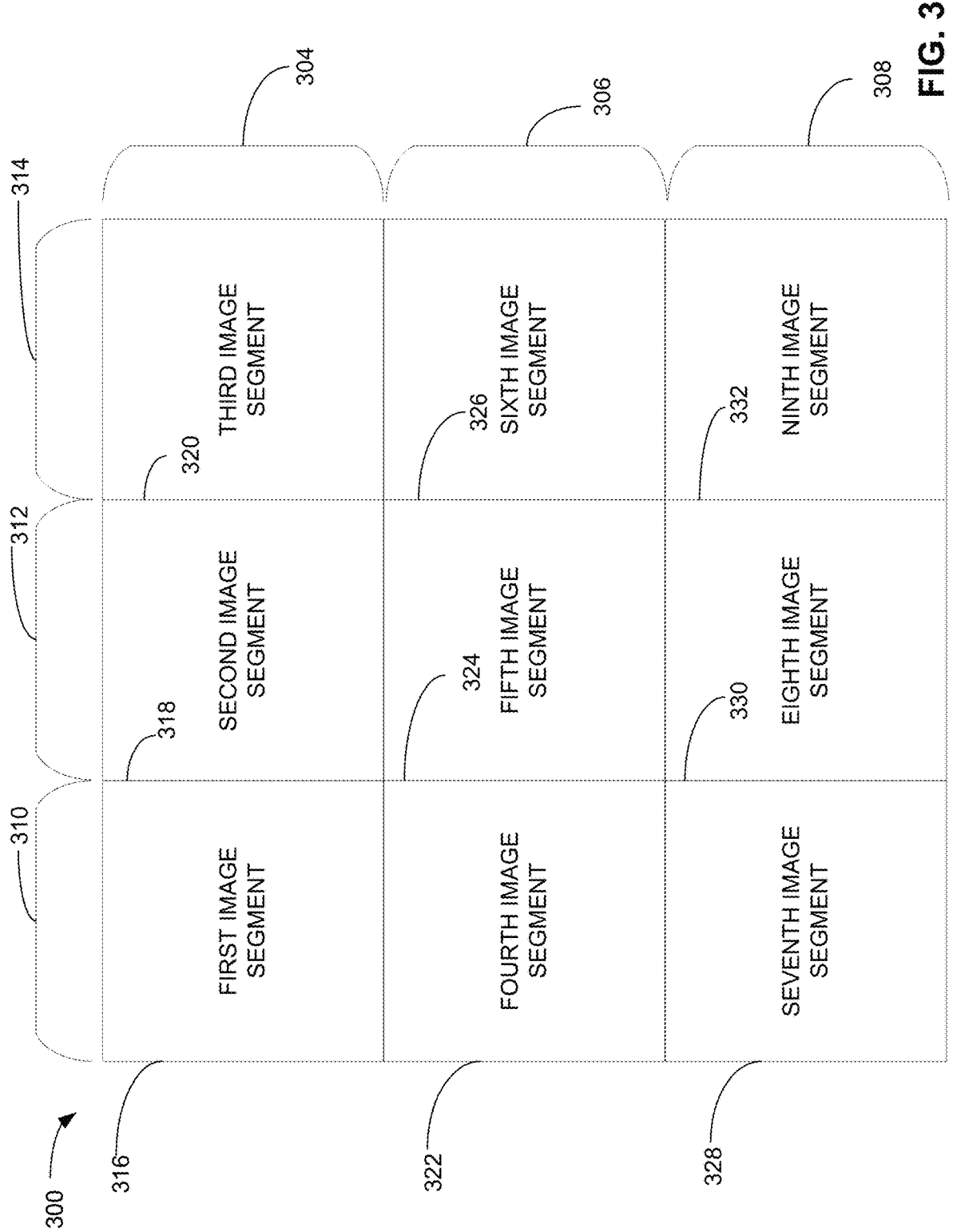
FIG. 3 is an example image divided into nine image segments.

FIG. 3 illustrates an example image frame 300 divided into a set of image segments. In some examples, the example image segmenter 206 segments/divides the image frame into image segments by dividing the image frame 300 into a set of rows (e.g., a top row 304, a middle row 306, and a bottom row 308) and a set of columns (e.g., a first column 310, a second column 312, and a third column 314) to thereby form a grid defining the image segments. In some examples, the image may be divided into any number of rows/columns or in any desired fashion. For reference purposes, the image segments are referred to using numbers that proceed in ascending order row-by-row starting at the top row and proceeding in a left-to-right fashion within each row. As a result, the image segments of the top-most row are referred so as a first image segment 318, a second image segment 316 and a third image segment 320. Similarly, the image segments of the middle row are referred to as the fourth image segment 322, the fifth image segment 324, and the sixth image segment 326. And, the image segments of the bottom row are referred as the seventh image segment 328, the eighth image segment 330, and the ninth image segment 332.

For references purposes, the image segments 316-332 are also described as being associated with one of three tiers. The first tier contains the center-most image segment (e.g., the fifth image segment 324), the second tier contains image segments that share a border with the center-most, fifth image segment (e.g., the second image segment 318, the fourth image segment 322, the sixth image segment 326, and the eighth image segment 330) and the third tier contains image segments that are peripheral to the center-most, fifth image segment 324 (e.g., the first image segment 316, the third image segment 320, the seventh image segment 328, and the ninth image segment 332). As can be seen from FIG. 3, the peripheral image segments contain image content that is located at the corners of the image frame 300.

In some examples, the example segmenter 206 places the image segments into an example segment queue 208 in a conventional (also referred to as a scan line) order. In some examples, the scan line is the order used by conventional virtual reality systems to encode/transmit image segments. Thus, the first segment 316 occupies a first position in the scan line order and in the segment queue 208, the second segment 318 occupies a second position in the scan line order and in the segment queue 208, the third segment 320 occupies a third position in the scan line order and in the segment queue 208, and so on.

In some examples, the example image segmenter 206 notifies the example segment ordered 210 when the image segments are placed in the segment queue 208 in the scan line order. In response to the notification, the segment orderer 210 rearranges the image segments in the segment queue 208 according to a first example enhanced encoding order.

FIG. 4A illustrates the image segments positioned in the example segment queue 208 in the scan line order 410 and FIG. 4B illustrates the image segments in the first example enhanced encoding order 420. In some examples, the example segment orderer 210 rearranges the image segments in the segment queue 208 into the first enhanced encoding order such that the fifth image segment 324 occupies the first position, the second image segment 318 occupies the second position, the first image segment 316 occupies the third position, the fourth image segment 322 occupies the fourth position, the third image segment 320 occupies the fifth position, the sixth image segment 326 occupies the sixth position, the seventh image segment 328 occupies the seventh position, the eighth image segment 330 occupies the eighth position, and the ninth image segment 332 occupies the ninth position. After the segment orderer 210 has rearranged the image segments to the non-scan line order, the segment orderer 210 notifies the example encoder 212 which extracts and encodes the image segments from the segment queue 208 in the first enhanced encoding order. The encoder 212 supplies the encoded image segments to the example wireless transmitter 214 in the first enhanced encoding order. The wireless transmitter 214 transmits the encoded segments to the example head-mounted display unit 120 in the first enhanced encoding order.

The example wireless receiver 216 of the example head-mounted display unit 120 receives the image segments in the first example enhanced encoding order. In some examples, the example decoder 218 decodes the image segments in the scan line order described above (e.g., the first image segment 316 is decoded first, the second image segment 320 is decoded second, the third image segment 322 is decoded third, and so on.) The decoder 218 then supplies the decoded image segments, in the scan line order, to a screen/display/lens 222 of the head-mounted display unit 120 to be rendered thereon.

FIG. 5 is a table 500 that illustrates a comparison of the scan line order in which the example decoder 218 decodes the image segments (see the first row 510 of FIG. 5) to the first example enhanced encoding order in which image segments are encoded/transmitted to the head-mounted display unit 120 (see the second row 520 of FIG. 5). As the scan line order and the first enhanced encoding order are different, FIG. 5 also identifies a time difference (see the third row 530 of FIG. 5) between the encoding/transmitting of each image segment and the decoding of each image segment. The time differences of the third row 530 of FIG. 5 are represented as a multiple of a time period, "$t_0$," in which an image segment is expected to arrive at the example decoder 218 (see FIG. 2) after being transmitted by the example wireless transmitter 214 (see FIG. 2). Instances in which the time of transmission of an image segment occurs after the time at which decoding is set to occur, are indicated using a negative number.

As illustrated in the first row 510 of FIG. 5, the scan line decode order indicates the first image segment 316 is decoded first, the second image segment 318 is decoded second, the third image segment 320 is decoded third, and so on, until all nine image segments are decoded and displayed. As illustrated in the second row 520 of FIG. 5, the first enhanced encoding order indicates the fifth image segment 324 is encoded first, the second image segment 318 is encoded second, the first image segment 316 is encoded third, the fourth image segment 322 is encoded fourth, the third image segment 320 is encoded fifth, the sixth image segment 326 is encoded sixth, the eighth image segment 328 is encoded seventh, the seventh image segment 330 is encoded eighth, and the ninth image segment 332 is encoded ninth. The third row 530 of FIG. 5 illustrates the effects of using the scan line order to decode the image segments when the first enhanced encoding order is used to encode/transmit each of the image segments.

As illustrated in row three 530 of FIG. 5, when the first enhanced encoding order is used to encode/transmit segments of an image, the fifth image segment 324 is encoded/transmitted four time periods ($4t_0$) earlier than the example decoder 218 (see FIG. 2) is ready to decode the fifth image segment 324. In contrast, when the scan line order is used to encode/transmit, the fifth image segment 324 is encoded/transmitted and decoded in a same time period. Thus, the first enhanced encoding order provides the fifth image segment 324 additional time to arrive at the decoder 218 and thereby improves the likelihood of successful decoding of the fifth image segment 324 as compared to using the scan line order for image segment encoding and transmitting. In contrast, when the first enhanced encoding order is used to encode/transmit, the second image segment 318 is encoded/transmitted in the same time period that the decoder 218 will be ready to decode the second image segment 318. The same is true when the scan line order is used to encode/transmit. Thus, the usage of the first enhanced encoding order has the same likelihood of success for the second image segment 318 as using the scan line order.

Referring still to row three 530 of FIG. 5, when the first enhanced encoding order is used, the first image segment 316 is encoded/transmitted two time periods later than a time period in which the decoder 218 is ready to begin decoding the first image segment 316. In contast, when the scan line order is used to encode/transmit, the first image segment 316 is encoded/transmitted and decoded in a same time period. Thus, using the first enhanced encoding order negatively impacts the likelihood of successful decoding of the first image segment 316 as compared to using the scan line order for encoding. When the first enhanced encoding order is used to encode/transmit, the fourth image segment 322 is encoded/transmitted and decoded in a same time period. Likewise, when the scan line order is used to encode/transmit, the fourth image segment 322 is encoded/transmitted and decoded in a same time period. Thus, using the first enhanced encoding order does not change the likelihood of successful decoding of the fourth image segment 322 as compared to using the scan line order. When the first enhanced encoding order is used to encode/transmit, the third image segment 320 is encoded/transmitted two time periods later than a time at which the decoder 218 is ready to begin decoding the third image segment 320. When the scan line order is used to encode/transmit, the third image segment 316 is encoded/transmitted and decoded in a same time period. Thus, using the first enhanced encoding order negatively impacts the likelihood of successful decoding of the third image segment 320 as compared to using the scan line order for encoding.

Referring still to FIG. 5, when the first enhanced encoding order is used to encode/transmit, the sixth image segment 326 is encoded/transmitted and decoded in a same time period. The same is true for the sixth image segment 326 when the scan line order is used. Thus, using the first enhanced encoding order does not change the likelihood of successful decoding of the sixth image segment 326 as compared to using the scan line order for encoding. In contrast, when the first enhanced encoding order is used to encode/transmit, the eighth image segment 330 is encoded/transmitted one time period earlier than a time at which the example decoder 218 (see FIG. 2) is ready to begin decoding the eighth image segment 330. In contrast, when the scan line order is used to encode/transmit, the eighth image segment 316 is encoded/transmitted and decoded in a same time period. Thus, using the first enhanced encoding order gives the eighth image segment 330 more time to arrive at the decoder 218 thereby positively impacting the likelihood of successful decoding of the eighth image segment 330 as compared to using the scan line order for encoding.

Referring still to FIG. 5, when the first enhanced encoding order is used to encode/transmit, the seventh image segment 328 is encoded/transmitted one time period later than a time at which the example decoder 218 (see FIG. 2) is ready to begin decoding the seventh image segment 328. In contrast, when the scan line order is used to encode/transmit, the seventh image segment 316 is encoded/transmitted and decoded in a same time period. Thus, using the first enhanced encoding order gives the seventh image segment 328 less time to arrive at the decoder 218 than the amount of time provided when the scan line order is used. As a result, the use of the first enhanced encoder order negatively impacts the likelihood of successful decoding of the seventh image segment 328 as compared to using the scan line order for encoding.

When the first enhanced encoding order is used to encode/transmit, the ninth image segment 328 is encoded/transmitted and decode in a same time period. The same is true when the scan line encoding is used. Thus, using the first enhanced encoding order does not change the likelihood of successful decoding of the ninth image segment 328 as compared to using the scan line order for encoding.

To further quantify the effect of using the first enhanced encoding order versus using the scan line order to encode/transmit the image segments, the FIG. 6A presents a graph that illustrates an example success rate of receiving and decoding each of the nine image segments when the nine image segments are encoded/transmitted (and decoded) in the scan line order. In the illustrated example, the success rate of receiving and decoding is 90% for each of the nine image segments when the scan line order is used to encode/transmit and decode the image segments. FIG. 6B presents a graph that illustrates an example success rate of receiving and decoding each of the nine image segments when the image segments are encoded/transmitted in the first example enhanced encoding order and decoded in the scan line order. In the illustrated, example of FIG. 6B, the success rate of receiving and decoding the fifth image segment is 100% when the first enhanced encoding order is used. The success rate of receiving and decoding the second, fourth, sixth, and ninth image segments is 90% when the first enhanced encoding order is used. This is expected because the second, fourth, sixth and ninth image segments occupy the same position in both the conventional and modified orders. The success rate of receiving and decoding the first, third, and seventh image segments is 80% or lower when the first enhanced encoding order is used. As seen in table of FIG. 5, this drop in success rate from 90% to 80% or less is is caused by the delay in transmission of the first, third and seventh image segments in the first enhanced encoding order relative to the decode time of the first, third, and seventh image segments. Thus, the success rate achieved when using the first enhanced encoding order is improved for the fifth image segment which contains the center of the image and is also improved for the eighth image segment (which contains non-peripheral image content). As the fifth image segment and the eighth image segment contain non-peripheral image content that is more important to the rendering of the image, the increased likelihood of successful decoding of these segments lends an important benefit to the rendering of the image made up of the image segments. Although the success rates achieved for the first, third, and seventh image segments experience a decline from 90% to 80% or less) each of the first, third, and seventh image segments contain peripheral image content that is less important to the rendering of the image, and thus, may be tolerable.

FIG. 7 illustrates example contents of the example segment queue 208 when the example image segments are arranged in a second enhanced encoding order. In some examples, a decode success rate below 80% cannot be tolerated for any of the image segments. In some such examples, the example segment orderer 210 can alternatively be configured to arrange the image segments in the example segment queue 208 using a second example enhanced encoding order. In some such examples, the segment orderer 210 in response to the notification from the example image segmenter 206 indicating that the segments have been placed into the queue 208, rearranges the image segments into the second enhanced encoding order. In some examples, when the segment orderer 210 arranges the image segments in the second enhanced modified order, the second image segment 318 occupies the first position in the segment queue 208, the first image segment 316 occupies the second position, the fifth image segment 324 occupies the third position, the third segment 320 occupies the fourth position, the fourth image segment 322 occupies the fifth position, the sixth image segment 326 occupies the sixth position, the eighth image segment 330 occupies the seventh position, the seventh image segment 328 occupies the eighth position, and the ninth segment 332 occupies the ninth position. After the segment orderer 210 has rearranged the image segments in the segment queue 208 to the enhanced modified order, the example segment orderer 210 notifies the example encoder 212 (see FIG. 2) which extracts and encodes the image segments from the segment queue 208 in the second enhanced encoding order. The encoder 212 supplies the encoded image segments to the example wireless transmitter 214 which wirelessly transmits the encoded image segments to the example head-mounted display unit 120.

As described above, the example wireless receiver 216 of the example head-mounted display unit 120, receives the image segments in the second enhanced encoding order. In some examples, the example decoder 218 of the head-mounted display unit 120 decodes the image segments in the scan line decoding order described above (e.g., the first image segment is decoded first, the second image segment is decoded second, the third image segment is decoded third, and so on.) The image segments, when decoded, are supplied, in the scan line decoding order, by the decoder 218 to the example screen/display/lens 220 of the head-mounted display unit 120 for rendering thereon.

FIG. 8 is a table 800 to compare the scan line order in which the decoder decodes the image segments (the first row 810) to the example second enhanced encoding order in which the image segments are encoded/transmitted to the head-mounted display unit 120 (the second row 820). As the scan line order and the second enhanced encoding order are different, FIG. 8 also identifies a time difference (the third row 830) (in multiples of the time period, "to,") between the encoding/transmitting of each image segment and the readiness of the example decoder 218 to decode each image segment. Instances in which the time of transmission of an image segment occurs after the time at which the decoder 218 is ready to decode the image segment, are indicated using a negative number.

As illustrated in the first row 810 of FIG. 8, the example decoder 218 (see FIG. 2) decodes the image segments in the scan line order such that the first image segment 316 is decoded first, the second image segment 318 is decoded second, the third image segment 320 is decoded third, and so on, until all nine image segments have been decoded and displayed. As illustrated in the second row 820 of FIG. 8, the second enhanced encoding order indicates the second image segment 318 is encoded first, the first image segment 316 is encoded second, the fifth image segment 324 is encoded third, the third image segment 320 is encoded fourth, the fourth image segment 322 is encoded fifth, the sixth image segment 326 is encoded sixth, the eighth image segment 330 is encoded seventh, the seventh image segment 328 is encoded eighth, and the ninth image segment 332 is encoded ninth.

The third row 830 of FIG. 8 illustrates the effects of using the scan line order to decode the image segments when the second enhanced encoding order is used to encode/transmit each of the image segments. Using the second enhanced encoding order, the second image segment 318 is encoded/transmitted one time period ($1t_0$) earlier than the decoder 218 (see FIG. 2) will be ready to decode the second image segment 318. In contrast, when the scan line order is used to encode/transmit and decode, the second image segment is encoded/transmitted and decoded in a same time period, thus, the second image segment has a greater likelihood of being successfully decoded when the enhanced encoding order is used to encode/transmit as compared to the scan line order. When the second enhanced encoding order is used to encode/transmit, the first image segment 316 is encoded/transmitted a time period later than the decoder 218 is ready to decode the second image segment 318. In contrast, when the scan line order is used, the first image segment is encoded/transmitted and decoded in a same time period. Thus, the likelihood of the first image segment being successfully decoded is negatively impacted by using the second enhanced encoding order as compared to using the scan line order to encode/transmit.

Referring still to row three 830 of FIG. 8, when the second enhanced encoding order is used, the fifth image segment 324 is encoded/transmitted two time periods earlier than a time period at which the decoder 218 is ready to begin decoding the fifth image segment 324. In contrast, when the scan line order is used to encode/transmit, the fifth image segment 324 is encoded/transmitted and decoded in a same time period. Thus, using the fifth enhanced encoding order positively impacts the likelihood of successful decoding of the fifth image segment 324 as compared to using the scan line order for encoding. In contrast, when the second enhanced encoding order is used to encode/transmit, the third image segment 320 is encoded/transmitted a time period later than the decoder 218 is ready to decode the third image segment 320. When the scan line order is used to encode/transmit, the third image segment is encoded/transmitted and decoded in a same time period. Thus, using the second enhanced encoding order has a negative impact on the likelihood of successful decoding of the third image segment 320 as compared to using the scan line order.

When the second enhanced encoding order is used to encode/transmit, the fourth image segment 322 is encoded/transmitted one time period later than a time at which the example decoder 218 (see FIG. 2) is ready to begin decoding the fourth image segment 322. In contrast, when the scan line order is used to encode/transmit, the fourth image segment 322 is encoded/transmitted and decoded in a same time period. Thus, using the second enhanced encoding order negatively impacts the likelihood of successful decoding of the fourth image segment 322 as compared to using the scan line order for encoding.

Referring still to FIG. 8, when the second enhanced encoding order is used to encode/transmit, the sixth image segment 326 is encoded/transmitted is encoded/transmitted and decoded in a same time period. The same is true for the sixth image segment 326 when the scan line order is used. Thus, using the second enhanced encoding order does not change the likelihood of successful decoding of the sixth image segment 326 as compared to using the scan line order for encoding. When the second enhanced encoding order is used to encode/transmit, the eighth image segment 330 is encoded/transmitted one time period earlier than a time at which the example decoder 218 (see FIG. 2) is ready to begin decoding the eighth image segment 330. When the scan line order is used to encode/transmit, the eighth image segment 330 is encoded/transmitted and decoded in a same time period. Thus, using the second enhanced encoding order gives the eighth image segment 330 more time to arrive at the decoder 218 thereby positively impacting the likelihood of successful decoding of the eighth image segment 330 as compared to using the scan line order for encoding.

When the second enhanced encoding order is used to encode/transmit, the seventh image segment 328 is encoded/transmitted one time period later than a time at which the example decoder 218 (see FIG. 2) is ready to begin decoding the seventh image segment 328. In contrast, when the scan line order is used to encode/transmit, the seventh image segment 328 is encoded/transmitted and decoded in a same time period. Thus, using the second enhanced encoding order gives the seventh image segment 328 less time to arrive at the decoder 218 than the amount of time provided when the scan line order is used. As a result, the use of the second enhanced encoder order negatively impacts the likelihood of successful decoding of the seventh image segment 328 as compared to using the scan line order for encoding.

When the second enhanced encoding order is used to encode/transmit, the ninth image segment 332 is encoded/transmitted and decode in a same time period. The same is true when the scan line encoding is used. Thus, using the second enhanced encoding order does not change the likelihood of successful decoding of the ninth image segment 332 as compared to using the scan line order for encoding.

Thus, using the second enhanced encoding order to encode and transmit the image segments (as compares to using the scan line order) increases the likelihood of successful decoding of the second, fifth, and the eighth image segments, has no effect on the likelihood of successful decoding of the sixth and ninth image segments, and has an adverse effect on the likelihood of the successful decoding of the first, third, fourth, and seventh image segments. As described above, when the second enhanced encoding order is used to encode/transmit the image segments, the likelihood of successful decoding of some of the image segments (e.g., the first image segment, the third image segment, the fourth image segment and the seventh image segments) is adversely affected. In some examples, this adverse effect is lessened when the example encoder 212 (see FIG. 2) is encoding faster than the example decoder 218 is decoding the received image segments. For example, in some examples, the encoder 212 is encoding at a rate of about 5 milliseconds (ms) encode time per image frame and the encoder is producing data to be displayed at a rate of about 11.1 ms (i.e., the encoder takes 5 ms to encode an image which will take 11 ms to be displayed). This time difference gives the image segments more time to arrive and thus, positively impacts the likelihood of successful deliver and decoding of the image segments.

Figure 9:
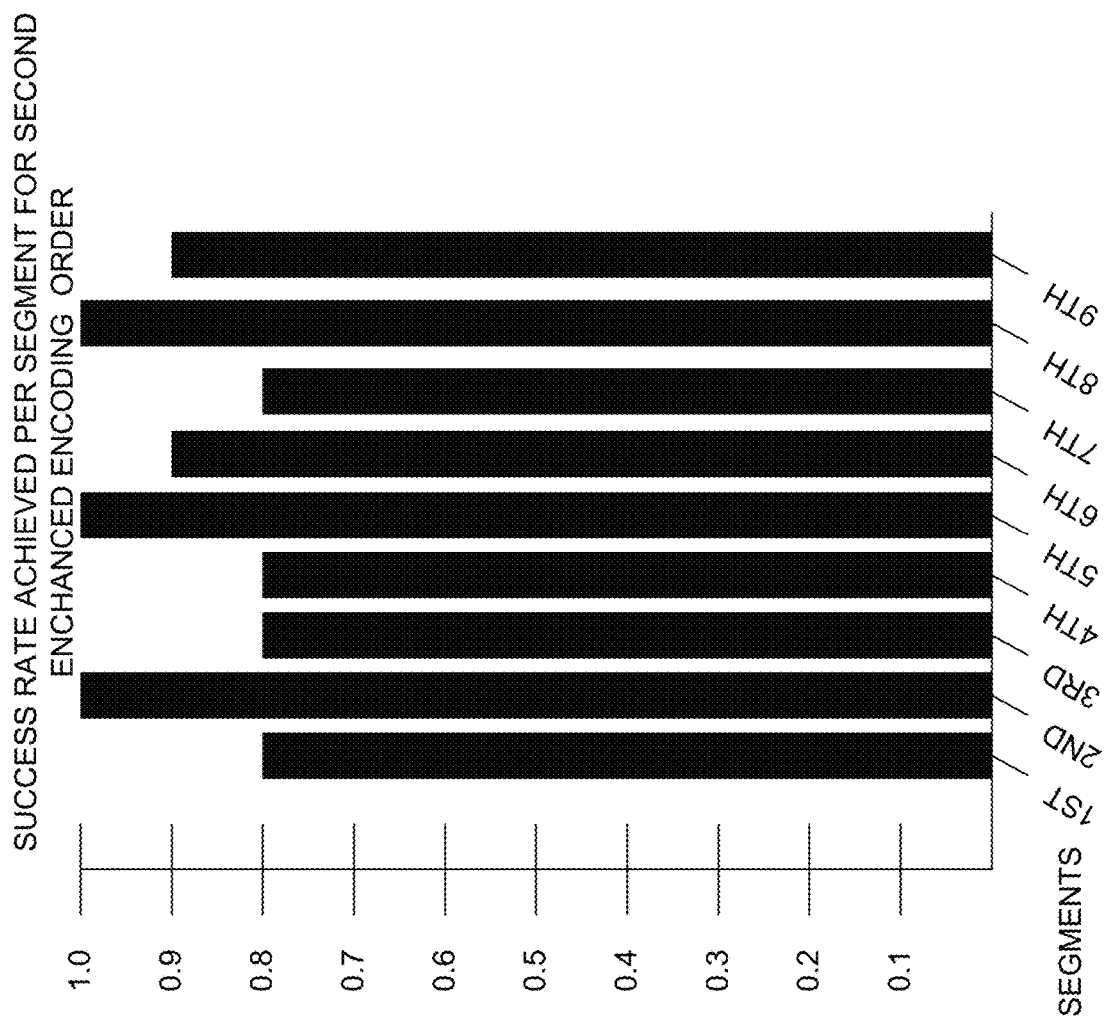
FIG. 9 is a graph illustrating an example decoding success rate achieved for each image segment when the second enhanced encoding order is used to encode/transmit the image segments.

FIG. 9 is a graph 900 that illustrates an example decoding success rate for each of the nine image segments when the image segments are encoded/transmitted in the second example enhanced encoding order and decoded in the scan line order. As illustrated in the example of FIG. 9, the success rate of decoding the second, fifth and eighth image segments is at or near 100% when the second enhanced encoding order is used. The success rate of receiving and decoding the sixth and ninth image segments is 90% when the second enhanced encoding order is used. Note that this is expected because the success rate for these segments is 90% when the scan line order is used to encode/transmit and the sixth and ninth image segments occupy the same position in both the conventional and modified orders. The success rate of decoding the first, third, fourth and seventh image segments is 80% when the second enhanced encoding order is used. As can be seen with reference also to FIG. 8, this drop in success rate from 90% to 80% can be attributed to the delay in transmission of the first, third, fourth and seventh image segments in the second enhanced encoding order relative to the decode time of the first, third, fourth, and seventh image segments.

Thus, the success rate achieved when using the second enhanced encoding order is improved for the second, fifth and eighth image segments which contain image content that is at or bordering the center of the image (e.g., tier 1 and tier 2). As the second, fifth and eighth image segments contain content that is at or bordering the center of the image, these image segments contain important content and are, therefore, more important to the rendering of the image. As a result, the increased likelihood of successful decoding of the second, fifth and eighth image segments lends an important benefit to the virtual reality effected by the virtual reality system. Further, although the success rate achieved for the first, third, fourth and seventh image segments experiences a decline from 90% to 80% each of the first, third, fourth and seventh image segments contain peripheral image content that is less important to the rendering of the image, and thus, may be tolerable. Further still, the second enhanced encoding order never causes the success rate to decline below 80%.

While an example manner of implementing the virtual reality console 110 and the head-mounted display unit 120 of FIG. 1 is illustrated in FIG. 2, one or more of the elements, processes and/or devices illustrated in FIG. 2 may be combined, divided, re-arranged, omitted, eliminated and/or implemented in any other way. Further, the example image processor 202, example storage 204, example image segmenter 206, example segment queue 208, example segment orderer 210, example encoder 212, the example wireless transmitter 214, the example wireless receiver 216, the example decoder storage 217, the example image decoder 218, the example display 220, and/or, more generally, the example virtual reality console 110 and head-mounted display unit 120 of FIG. 1 may be implemented by hardware, software, firmware and/or any combination of hardware, software and/or firmware. Thus, for example, any of the example image processor 202, example storage 204, example image segmenter 206, example segment queue 208, example segment orderer 210, example encoder 212, the example wireless transmitter 214, the example wireless receiver 216, the example decoder storage 217, the example image decoder 218, the example display 220, and/or, more generally, the example the example virtual reality console 110 and head-mounted display unit 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, image processor 202, example storage 204, example image segmenter 206, example segment queue 208, example segment orderer 210, example encoder 212, the example wireless transmitter 214, the example wireless receiver 216, the example decoder storage 217, the example image decoder 218, and/or the example display 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image processor 202, example storage 204, example image segmenter 206, example segment queue 208, example segment orderer 210, example encoder 212, the example wireless transmitter 214, the example wireless receiver 216, the example decoder storage 217, the example image decoder 218, the example display 220 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
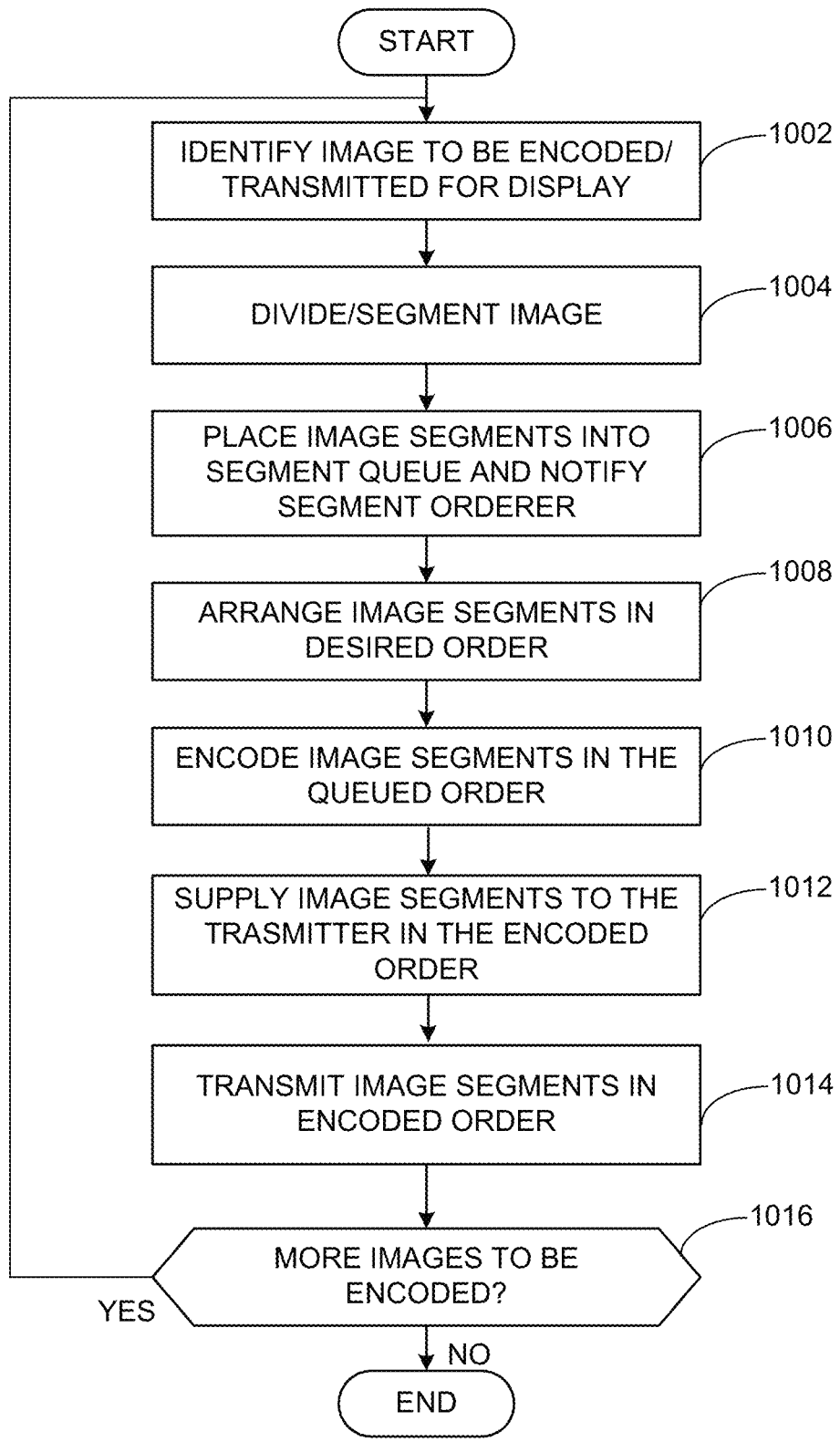
FIG. 10 is a flowchart representative of example machine readable instructions which may be executed to implement the example virtual reality console of FIG. 1 and/or FIG. 2.
Figure 11:
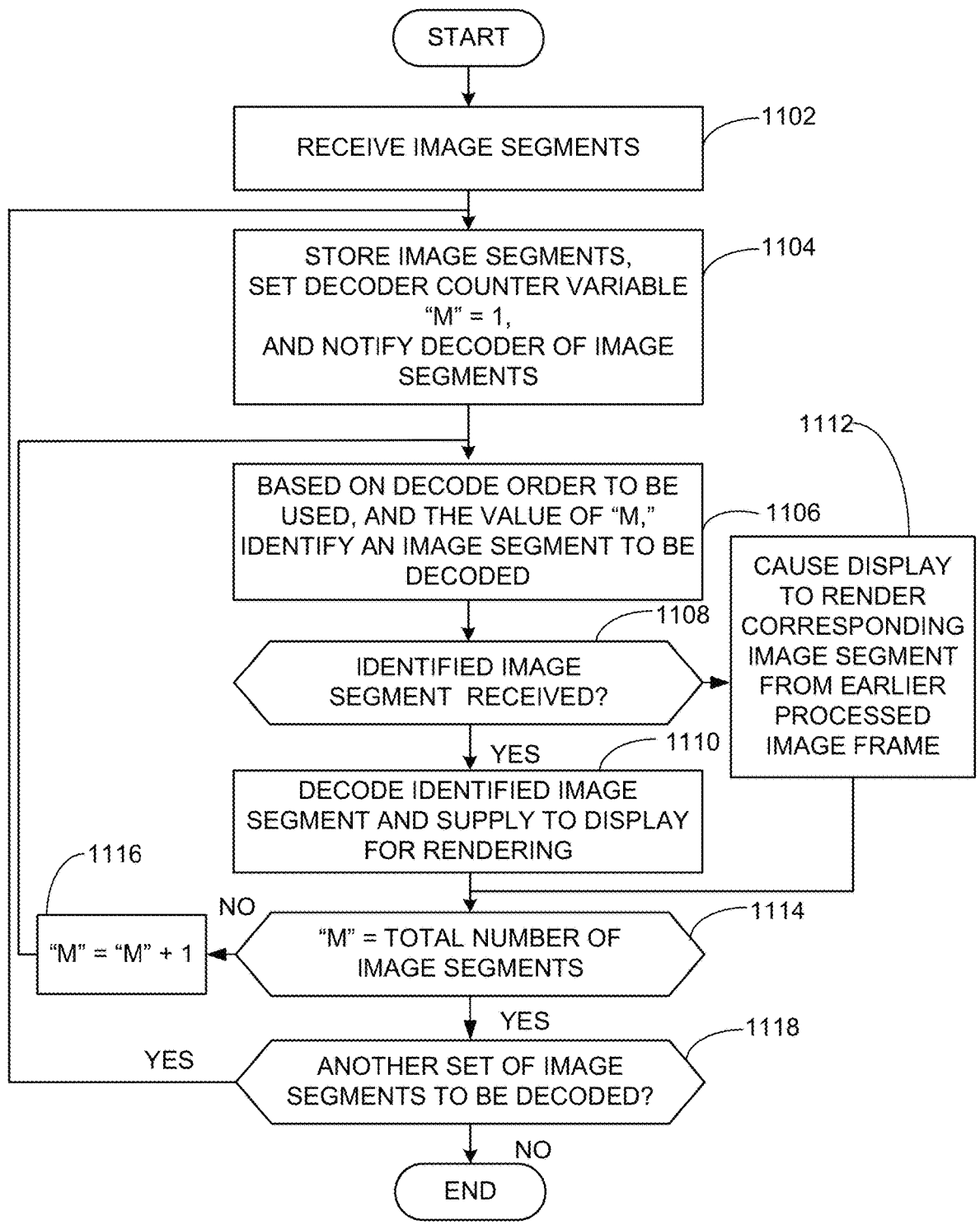
FIG. 11 is a flowchart representative of example machine readable instructions which may be executed to implement the example head-mounted display unit of FIG. 1 and/or FIG. 2.

A flowchart representative of example hardware logic and/or machine readable instructions for implementing the virtual reality console 110 of FIG. 2 is shown in FIG. 10 and a flowchart representative of example hardware logic or machine readable instructions for implementing the head-mounted display unit 120 of FIG. 2 is shown in FIG. 11. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10 and 11, many other methods of implementing the example virtual reality console 110 and/or the head-mounted display unit 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A and B and C.

The program 1000 of FIG. 10 begins at a block 1002 at which the example processor 202 (see FIG. 2) identifies an image to be encoded and transmitted from the example virtual reality console 110 (see FIGS. 1 and 2) to the example head-mounted display unit 120 (see FIGS. 1 and 2). In some examples, the processor 202 places the image to be encoded into the example storage 204. The example image segmenter 206 (see FIG. 2) divides the image frame stored in the example storage 204 into segments (block 1004). In some examples, the image segmenter 206 divides the image into nine image segments by dividing the image into a grid having three rows and three columns. In some examples, the nine image segments contain non-overlapping image content. In some examples, example first, second and third image segments are in the top row of the image grid, the first image segment is the left-most segment of the top row, the second image segment is the middle segment of the top row, and the third image segment is the left-most segment of the top row. In some examples, example fourth, fifth and sixth image segments are in the middle row of the image grid and the fourth image segment is the left-most segment of the middle top row, the fifth image segment the middle segment of the middle row, and the sixth image segment is the right-most segment of the middle row. In some examples, example seventh, eighth, and ninth image segments are in the bottom row of the image grid, and the seventh image segment is the left-most segment of the bottom row, the eighth image segment is the middle segment of the bottom rowm and the ninth image segment is the right-most segment of the bottom row.

The example image segmenter 206 places the image segments into the example segment queue 208 (see FIG. 2) in scan line order (block 1006). As a result, the first segment is placed in a first position of the segment queue 208, the second segment is placed in a second position of the segment queue 208, and the third segment is placed in a third position of the segment queue 208. In addition, the fourth segment is placed in a fourth position of the segment queue 208, the fifth segment is placed in a fifth position of the segment queue 208, the sixth image segment is placed in a sixth position in the segment queue 208, the seventh image segment is placed in a seventh position in the segment queue 208, the eighth image segment is placed in an eighth position in the segment queue 208, and the ninth image segment is placed in a ninth position in the segment queue 208. In addition, in some examples, the image segmenter 206 notifies the example segment orderer 210 that image segments have been placed into the image queue 208 (also at block 1006).

The example segment orderer 210 rearranges the order in which the image segments are stored in the segment queue 208 (block 1008). In some examples, the segment orderer 210 rearranges the image segments so that the image segments are arranged in the first enhanced encoding order (e.g., the fifth image segment occupies the first position, the second image segment occupies the second position, the first image segment occupies the third position, the fourth image segment occupies the fourth position, the third image segment occupies the fifth position, the sixth image segment occupies the sixth position, the eighth image segment occupies the seventh position, the seventh image segment occupies the eighth position, and the ninth image segment occupies the ninth position). In some examples, the example segment orderer 210 arranges the image segments in the second enhanced encoding order (e.g., the second image segment occupies the first position, the first image segment occupies the second position, the fifth image segment occupies the third position, the third image segment occupies the fourth position, the fourth image segment occupies the fifth position, the sixth image segment occupies the sixth position, the eighth image segment occupies the seventh position, the seventh image segment occupies the eighth position, and the ninth image segment occupies the ninth position). In some examples, the segment orderer 210 arranges the image segments in the segment queue 208 such that one or more of the image segments associated with the first tier and/or the second tier is moved to an earlier position in the segment queue 208 than the position occupied by the same image segments in the scan line order. In some such examples, the first and second tiers contain image segments that are located at the center of the image (e.g., the fifth image segment) or share a border with the segment located at the center of the image. In some examples, the segment orderer 210 arranges the order of the image segments in the segment queue 208 such that one or more of the respective image segments containing image content that is in a third tier (e.g., located in a corner of the image) is moved to a later position in the segment queue 208 than the position occupied by the respective image segments occupy when arranged in the scan line order.

After the example segment orderer 210 has reordered the image segments, the example encoder 212 encodes the image segments in a same order as the image segments are stored in the segment queue 208 (e.g., the image segment occupying the first position is encoded first, the image segment occupying the second position is encoded second, the image segment occupying the third position is encoded third, etc.) (block 1010). The encoder 212 supplies each encoded image segment to the example transmitter 214 (see FIG. 2) in the same order as the image segments are encoded (block 1012) and the transmitter 214 wirelessly transmits the image segments in the same order as the image segments are encoded (block 1014). After the image segments have been encoded, the program returns to block 1002 and the blocks subsequent thereto to encode a next image, or, if no further images are to be encoded/transmitted (as determined at block 1016), the program 1000 ends.

The program 1100 of FIG. 11 begins at a block 1102 at which the example receiver 216 (see FIG. 2) of the example head-mounted display unit 120 (see FIG. 1 and FIG. 2) wirelessly receives one or more image segments from the example transmitter 214 (see FIG. 2) of the virtual reality console 110 (see FIG. 1 and FIG. 2). In some examples, the receiver 216 places the received image segments into a decoder storage 217 and sets a decoder counter variable, "M," equal to one (block 1102). In some such examples, the example receiver 216 notifies the decoder 218 that encoded image segments have been received and stored (also at block 1104).

In response to the notification, the image decoder 218 identifies, based on a decode order to be used, and based on a value of the counter variable "M," which of the first, second, third, fourth, fifth, sixth, seventh, eighth and ninth image segments is to be decoded first (block 1106). In some such examples, during a first execution of the program 1100, the image decoder 218 identifies the number of the image segment to be decoded first based on the decoder counter variable M being equal to one. In later executions of the program 1100, the image decoder 218 identifies the number of the image segment to be decoded based on the current value of the decoder counter variable M. Thus, if the decoder counter variable "M" is equal to two, the decoder identifies, based on the order to be used, the number of the image segment to be decoded second. If the decoder counter variable "M" is equal to three, the decoder identifies, based on the order to be used, the number of the image segment to be decoded third, and so on and so forth. the image decoder 218 begins a decode process by which the stored image segments received from the virtual reality console are decoded (block 1104). In some examples, the image decoder 218 is configured to decode image segments in the scan line order. In some examples, the image decoder 218 is configured to decode image segments in the first enhanced encoding order, in the second enhanced encoding order, or in any other desired order. For example, emerging image/video display technologies (e.g., displays adhering to the VESA displayID 2.0 specification) have the ability to output pixels from the decoder in an arbitrary order (e.g., a non scan line order). The image decoder 218 of FIG. 2 can similarly be configured to decode/output the image segments for display in any arbitrary order. In some examples, the image decoder is configured to output the image segments in an order that operates to decode and display the image segments having the most important content as early as possible. In some examples, the orders (e.g., the first enhanced encoding order, the second enhanced encoding order, etc.) in which the image segments are encoded/transmitted and then decoded/displayed are selected to ensure that the image segments having the most important content traverse the wireless link on time, have the highest possible decode success rate and thereby enrich the user experience by providing better quality images at the head mounted display.

In some examples, to assist the image decoder 208 in selecting appropriate image segments to be decoded based on a decode order being employed (e.g., a scan line order, the first example enhanced order, the second example enhanced order, etc.), the example image segments are transmitted with information identifying the number of the image segment. The information can be included in a header, in a tag, etc. In some such examples, the segment number information is used by the image decoder 208 to identify the image segment number and place the image segment into a proper order for decoding. The image segment number is also used to identify how the content contained in the image segment is to be displayed relative to the content included in other image segments. Any other technique may be used to identify the number of an image segment to the decoder for use in decoding the image segment in a desired order and for displaying the image segment properly.

Upon identifying the image segment that is to be decoded, the example image decoder 218 determines whether the identified image segment has been received (e.g., is stored in the decoder storage) (block 1108). If the identified image segment has been received, the image decoder 218 decodes the identified image segment and supplies the decoded content of the identified image segment to the example a display 220 (see FIG. 2) for rendering thereat (block 1110). If the identified image segment has not yet been received, the image decoder 218 supplies the decoded content for an image segment having the same number as the identified image segment, but corresponding to an earlier transmitted frame/image, to the display 220 for rendering thereat (block 1112).

In some examples, after the identified image segment has been decoded/displayed or the corresponding image segment of the previous image frame has been displayed, the image decoder 218 determines whether the counter variable M is equal to the total number of image segments associated with the current frame (block 1114). If not, there are more image segments to be decoded for the current frame and the image decoder increments the counter variable M (block 1116) and then returns to the block 1106 and the blocks subsequent thereto to decode and display the next image segment in the order being used. If (at the block 1114) the counter variable M is determined to be equal to the total number of image segments associated with the current frame, the decoding of the current frame has been completed. As a result, the image decoder 218 determines whether another set of image segments associated with another image are to be decoded/displayed (block 1118). If there is another set of image segments to be decoded/displayed, the program 1100 returns to the block 1104 and the blocks subsequent thereto. If there is not another set of image segments to be decoded/displayed, the program 1100 ends.

Figure 12:
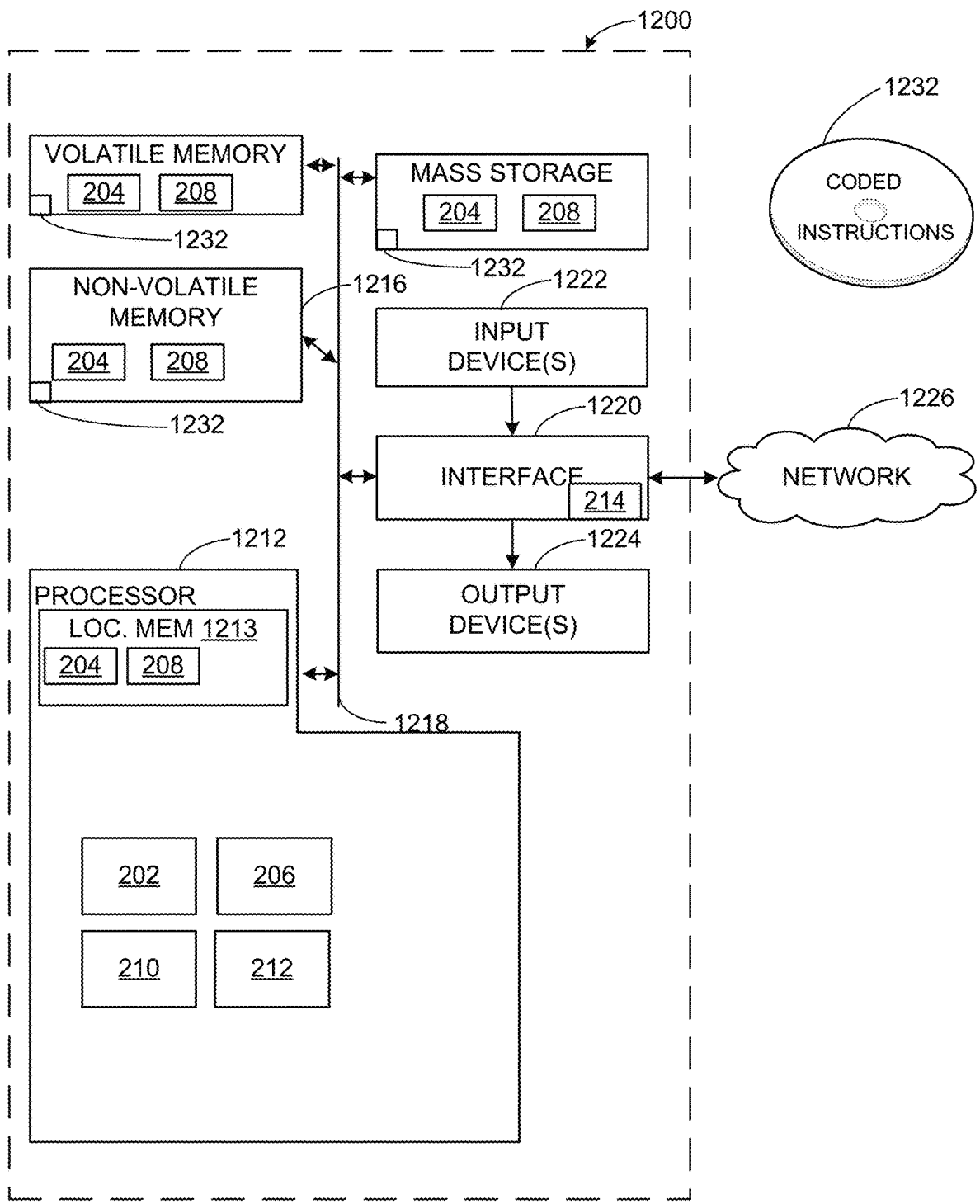
FIG. 12 is a block diagram of an example processing platform structured to execute the instructions of FIG. 10 to implement the example virtual reality console of FIG. 1 and/or FIG. 2.

FIG. 12 is a block diagram of an example processor platform 1200 structured to execute the instructions of FIG. 10 to implement the virtual reality console 110 of FIG. 1 and FIG. 2. The processor platform 1200 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image processor 202, the example image segmenter 206, the example segment queue 208, the example segment orderer 210, and the example encoder 212.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc. The interface circuit 1220 is used to implement the example wireless transmitter 214 of FIG. 2. In some examples, the interface 1220 circuit uses WiFi as defined in IEEE standard 802.11 to communication. In further examples, the interface circuit 1220 uses WiGig (as defined in 802.11ad and/or 802.11ay) to transmit the image segments.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. Any of the storage devices of FIG. 12 can be used to implement the example storage 204 and the example segment queue 208.

The machine executable instructions 1232 (e.g., the program 1000) of FIG. 10 may be stored in the mass storage device 1228, in the volatile memory 1214, in the non-volatile memory 1216, and/or on a removable non-transitory computer readable storage medium such as a CD or DVD.

Figure 13:
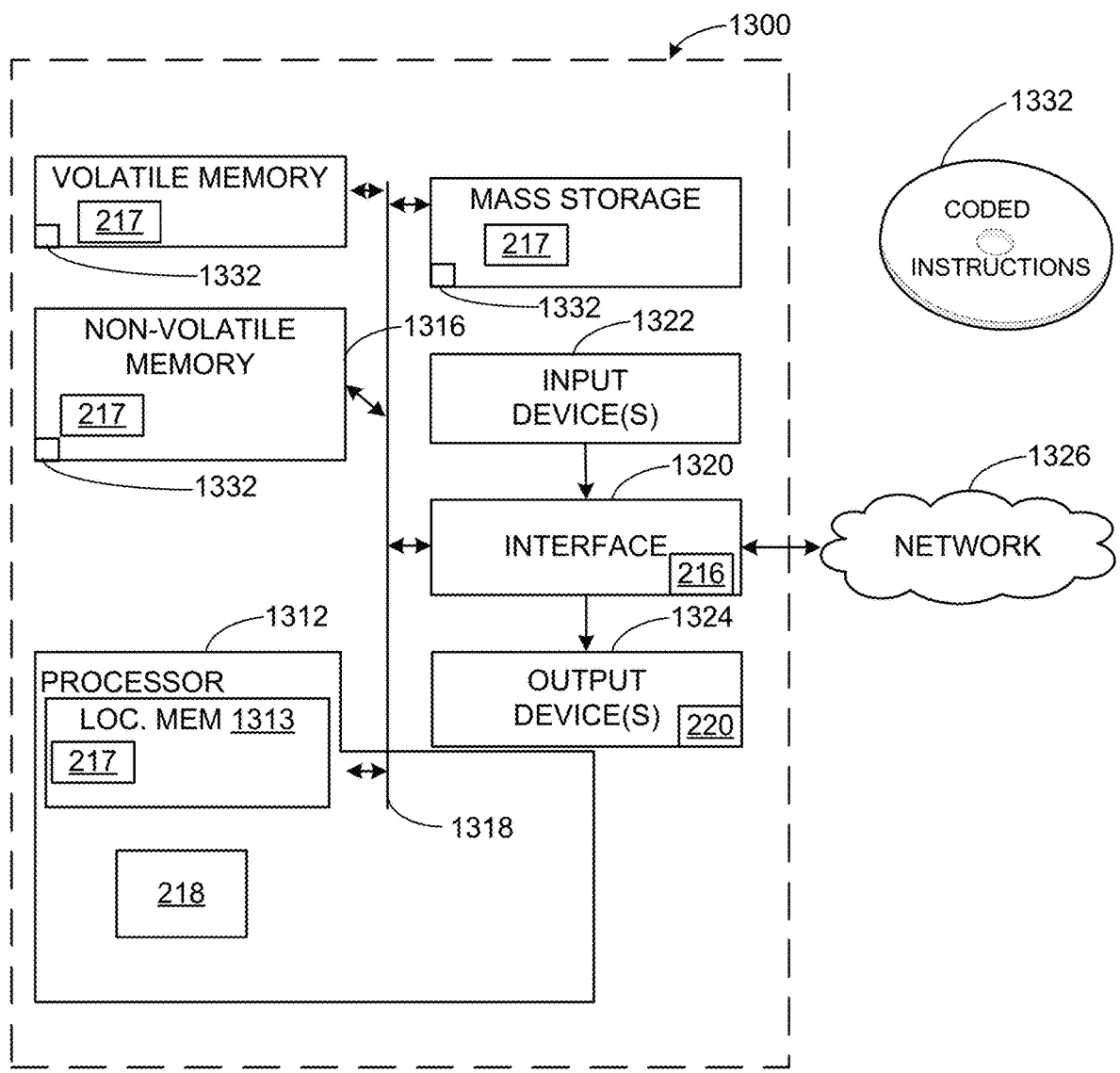
FIG. 13 is a block diagram of an example processing platform structured to execute the instructions of FIG. 11 to implement the example head-mounted display unit of FIG. 1 and FIG. 2.

FIG. 13 is a block diagram of an example processor platform 1300 structured to execute the instructions (e.g., the program 1100) of FIG. 11 to implement the example head-mounted display unit 120 of FIG. 1 and FIG. 2. The processor platform 1300 can be, for example, a head set or any other type of wearable device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image decoder 218 of FIG. 2.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a button, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor. The interface circuit 1320 is used to implement the example display 220 of FIG. 2.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc. The interface circuit 1320 is used to implement the example wireless receiver 216 of FIG. 2. In some examples, the interface 1320 circuit uses WiFi as defined in IEEE standard 802.11 to communication. In further examples, the interface circuit 1320 uses WiGig (as defined in 802.11ad and/or 802.11ay) to transmit the image segments.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. Any of the storage devices of FIG. 13 can be used to implement the example decoder storage 217 of FIG. 2.

The machine executable instructions 1332 (e.g., the program 1100) of FIG. 11 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that improve the throughput between a virtual reality console and a head-mounted display unit of a virtual reality system. The disclosed virtual reality console prioritizes the encoding and transmission of image segments containing visually important portions of the image including, for example, a center image segment containing content that includes the center of the image. Some examples additionally prioritize image segments that share a border with the center image segment. Some example systems, methods and apparatus disclosed herein balance prioritizing the center image segment with timely delivery of other image segments. Such example systems, methods and apparatus are configured to encode and transmit image segments such that a center image segment is encoded/transmitted earlier than the center segment would be encoded using a scan line order while maintaining a desired (e.g., 80%) delivery/decode success rate for the non-center image segments. Encoding/transmitting the center image segment and image segments bordering the center image segment earlier than such image segments are encoded/transmitted using a scan line order results in an improved "virtual reality" experience for the user as the most important image content is more likely to be successfully decoded and thus, included in the images displayed at the head-mounted display unit.

It should be understood that, although an image to be encoded is shown, for exemplary purposes, as divided into nine segments, the example image segmenter 206, the example segment orderer 210, the example encoder 212, the example transmitter 214, the example receiver 216, the example decoder 218 may be configured to operate on an image frame divided into any number of image segments. In examples in which greater or fewer than nine segments are used, the numbers of the image segments containing content located at the center the image, the periphery of the image, and the non-periphery of the image will, of course, be numbered differently than the same segments are numbered in the first enhanced encoding order, and the second enhanced encoding order. Regardless of the number of segments into which an image is divided, the same concepts apply in that the first enhanced encoding order places the highest priority on transmitting the center image segment (and therefore places the center segment as the first encoded/transmitted image segment), whereas the second enhanced encoding order places a higher priority on the center image segment and non-peripheral image segments (than the same segments are given in the scan line order) but not at the expense of causing too much delay to the peripheral image segments. Thus, the first enhanced encoding order encodes/transmits the center image segment first, thereby giving the successful arrival and decoding of the center image segment greatest likelihood of success and the second enhanced encoding seeks to raise strike a balance between raising the priority of the center image segment and the timely arrival of all image segments.

The following further examples are disclosed herein.

Example 1 is an apparatus to order a plurality of segments of an image for encoding and transmission to a display device. The apparatus of Example 1 includes a segment orderer to arrange the segments in an encoding order for encoding. The encoding order is different than a scan line order, and in the encoding order a center segment of the plurality of segments occupies a first position, the first position precedes a second position occupied by the center segment in the scan line order, and the center segment corresponds to a center of the image. The apparatus also includes an encoder to encode the segments in the encoding order and a wireless transmitter to transmit the encoded segments to the display device in the encoding order in which the encoded segments are encoded.

Example 2 includes the apparatus of claim 1. In Example 2, the encoding order further is such that a peripheral segment of the plurality of segments is to occupy a third position in the order, the third position is at least one of 1) a same position occupied by the peripheral segment in the scan line order, or 2) after a fourth position occupied by the peripheral segment in the scan line order, and the peripheral segment does not share a border with the center segment.

Example 3 includes the apparatus of Example 2. In Example 3, the peripheral segment is a first one of a plurality of peripheral segments, and the plurality of peripheral segments corresponds to corners of the image.

Example 4 includes the apparatus of Example 2. In Example 4, the encoding order further is such that at least one non-peripheral segment of the plurality of segments is to occupy a fifth position in the order, the fifth position precedes a sixth position occupied by the non-peripheral segment in the scan line order, and the at least one non-peripheral segment shares a border with the center segment.

Example 5 includes the apparatus of any of Examples 1-4, and also includes a segmenter to form the plurality of segments by dividing the image. In Example 5, the segmenter stores the plurality of segments in a queue in scan line order.

Example 6 includes the apparatus of Example 5. In Example 6, the segmenter divides the image into a grid containing a top row, a bottom row and a middle row, a left column a middle column and a right column, and the plurality of segments includes nine segments. In Example 6, a first segment is a left most segment in the top row, a second segment is a middle segment in the top row, a third second segment is a right-most segment in the top row, a fourth segment is a left-most segment in the middle row, a fifth segment is a middle segment in the middle row, a sixth segment is a right-most segment in the middle row, a seventh segment is a left-most segment in the bottom row, the eighth segment is a middle segment in the bottom row, and the ninth segment is a right-most segment in the bottom row. In Example 6, the scan line order is the first segment, the second segment, the third segment, the fourth segment, the fifth segment, the sixth segment, the seventh segment, the eighth segment, and the ninth segment and the encoding order is the second segment, the first segment, the fifth segment, the third segment, the fourth segment, the sixth segment, the eighth segment, the seventh segment, and the ninth segment.

Example 7 includes the apparatus of any of Examples 1-6. In Example 7, the portions of the image do not contain overlapping image content.

Example 8 includes one or more non-transitory machine-readable storage media storing machine-readable instructions that, when executed, cause one or more processors to at least arrange a set of image regions in a non-scan line order, and encode the image regions in the non-scan line order. In Example 8, use of the non-scan line order causes a center image region of the set of image regions to be encoded earlier than the center image segment would be encoded in a scan line order, and also causes a peripheral image region of the set of image regions to be encoded later than the peripheral image region would be encoded in the scan line order. In Example 8, the instructions further cause one or more processors to supply, in the non-scan line order, the encoded image regions to a transmitter for transmission to a display unit.

Example 9 includes the one or more non-transitory machine-readable storage media of Example 8. In Example 9, the peripheral image region is a first one of a plurality of peripheral regions and the plurality of peripheral regions correspond to corners of the image.

Example 10 includes the one or more non-transitory machine-readable storage media of Example 8. In Example 10, the use of the non scan line order further causes a non-peripheral image region of the set of image regions to be encoded earlier than the non-peripheral image segment would be encoded in the scan line order.

Example 11 includes the one or more non-transitory machine-readable storage media of any of Examples claims 8-10. In Example 11, the instructions further cause one or more processors to divide the image into non-overlapping image regions to form the set of image regions and store the set of image regions in a queue.

Example 12 includes the one or more non-transitory machine-readable storage media of Example 11. In Example 12, to divide the image, the instructions cause one or more processors to divide the image into a grid containing a top row, a bottom row and a middle row, a left column a middle column and a right column. In addition, the set of image regions includes nine image regions. In Example 12, a first image region is a left most image region in the top row, a second image region is a middle image region in the top row, a third image region is a right-most image region in the top row, a fourth image region is a left-most image region in the middle row, a fifth image region is a middle image region in the middle row, a sixth image region is a right-most image region in the middle row, a seventh image region is a left-most image region in the bottom row, an eighth image region is a middle image region in the bottom row, a ninth image region is a right-most image region in the bottom row. Also, in Example 12, the non-scan line order includes the second segment in a first position, the first segment in a second position, the fifth segment in a third position, the third segment in a fourth position, the fourth segment in a fifth position, the sixth segment in a sixth position, the eighth segment in a seventh position, the seventh segment in an eighth position, and the ninth segment in a ninth position.

Example 13 is an apparatus to order a plurality of image tiles. The apparatus of Example 13 includes means to position the plurality of image tiles in a non-scan line order. In Example 13, the plurality of image tiles include a center image tile corresponding to the center of an image, and the center image tile occupies an earlier encoding position in the non scan line order than the center image tile occupies in a scan line order. The apparatus also includes means to encode the plurality of image tiles in the non scan line order, means to transmit the encoded image tiles in the non scan line order to a display.

Example 14 includes the apparatus of Example 13. In Example 14, the non scan line order is a first encoding order in which a center image tile having content corresponding to a center of the image is encoded and transmitted before other ones of the plurality of image tiles are encoded and transmitted.

Example 15 includes the apparatus of Example 13. In Example 15, the non-scan line order is a second encoding order in which a center image tile having content corresponding to a center of the image occurs earlier than the center image tile occurs in a scan line order, and a peripheral image tile having content corresponding to a corner of the image occurs later than the peripheral image tile occurs in the scan line order.

Example 16 includes the apparatus of any of Examples 13-15. In Example 16, the plurality of image tiles also includes a peripheral image tile corresponding to a periphery of the image. The peripheral image tile occupies a later encoding position in the non scan line order than the peripheral image tile occupies in the scan line order.

Example 17 includes the apparatus of any of Examples 13-15. In addition, the apparatus of Example 17 further includes means to segment the image to form the plurality of image tiles.

Example 18 includes the apparatus of Example 17. In Example 18, the means to segment divides the image into a grid containing a top row, a bottom row and a middle row, a left column a middle column and a right column. In Example 18, the plurality of image tiles includes nine image tiles. A first image tile is a left most image tile in the top row of the grid, a second image tile is a middle image tile in the top row, a third second image tile is a right-most image tile in the top row, a fourth image tile is a left-most image tile in the middle row, a fifth image tile is a middle image tile in the middle row, a sixth image tile is a right-most image tile in the middle row, a seventh image tile is a left-most image tile in the bottom row, the eighth image tile is a middle image tile in the bottom row, and the ninth image tile is a right-most image tile in the bottom row. In Example 18, the scan line order is the first image tile, the second image tile, the third image tile, the fourth image tile, the fifth image tile, the sixth image tile, the seventh image tile, the eighth image tile, and the ninth image tile, and the first encoding order is the second image tile, the first image tile, the fifth image tile, the third image tile, the fourth image tile, the sixth image tile, the eighth image tile, the seventh image tile, and the ninth image tile.

Example 19 includes the apparatus of any of Examples 13-18. In Example 19, the image tiles do not contain overlapping image content.

Example 20 includes the apparatus of any of Examples 13-18. In Example 20, the apparatus is included in a virtual reality console and the encoded image tiles are transmitted wirelessly.

Example 21 is a method to order a plurality of segments of an image for encoding and transmission to a display device. The method of Example 21 includes ordering the segments in an encoding order for encoding. The encoding order is different than a scan line order, and the encoding order is such that a center segment of the plurality of segments is to occupy a first position in the encoding order, the first position precedes a second position occupied by the center segment in the scan line order, and the center segment corresponds to a center of the image. Example 21 also includes encoding the segments in the encoding order, and transmitting the encoded segments to the display device in the encoding order in which the encoded segments are encoded.

Example 22 includes the method of Example 21. In Example 22, the encoding order further is such that a peripheral segment of the plurality of segments is to occupy a third position in the order, the third position is at least one of 1) a same position occupied by the peripheral segment in the scan line order, or 2) after a fourth position occupied by the peripheral segment in the scan line order. In Example 22, the peripheral segment does not share a border with the center segment.

Example 23 includes the method of Example 22, In Example 23, the peripheral segment is a first one of a plurality of peripheral segments and the plurality of peripheral segments corresponds to corners of the image.

Example 24 includes the method of Example 22. In Example 24, the encoding order is such that at least one non-peripheral segment of the plurality of segments is to occupy a fifth position in the order, the fifth position precedes a sixth position occupied by the non-peripheral segment in the scan line order, and the at least one non-peripheral segment shares a border with the center segment.

Example 25 includes the method of any of Examples 21-24. The method of Example 25 further includes dividing the image to form the plurality of segments, and storing the segments in a queue in scan line order.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to order a plurality of segments of an image for encoding and transmission to a display device, the apparatus comprising:
   a segment orderer to arrange the segments in an encoding order for encoding, the encoding order being different than a scan line order, such that a center segment of the plurality of segments is to occupy a first position in the encoding order, the first position preceding a second position occupied by the center segment in the scan line order, the center segment corresponding to a center of the image;
   an encoder to encode the segments in the encoding order; and
   a wireless transmitter to transmit the encoded segments to the display device in the encoding order in which the encoded segments are encoded.

2. The apparatus of claim 1, wherein the encoding order is such that a peripheral segment of the plurality of segments is to occupy a third position in the encoding order, the third position being at least one of 1) a same position occupied by the peripheral segment in the scan line order, or 2) after a fourth position occupied by the peripheral segment in the scan line order, the peripheral segment not sharing a border with the center segment.

3. The apparatus of claim 2, wherein the peripheral segment is a first one of a plurality of peripheral segments, the plurality of peripheral segments corresponding to corners of the image.

4. The apparatus of claim 2, wherein the encoding order is such that at least one non-peripheral segment of the plurality of segments is to occupy a fifth position in the encoding order, the fifth position preceding a sixth position occupied by the non-peripheral segment in the scan line order, the at least one non-peripheral segment sharing a border with the center segment.

5. The apparatus of claim 1, further including a segmenter to form the plurality of segments by dividing the image, the segmenter to store the plurality of segments in a queue in the scan line order.

6. The apparatus of claim 5, wherein the segmenter is to divide the image into a grid containing a top row, a bottom row and a middle row, a left column, a middle column and a right column, and the plurality of segments including nine segments, a first segment being a left-most segment in the top row, a second segment being a middle segment in the top row, a third segment being a right-most segment in the top row, a fourth segment being a left-most segment in the middle row, a fifth segment being a middle segment in the middle row, a sixth segment being a right-most segment in the middle row, a seventh segment being a left-most segment in the bottom row, an eighth segment being a middle segment in the bottom row, a ninth segment being a right-most segment in the bottom row, the scan line order being the first segment, the second segment, the third segment, the fourth segment, the fifth segment, the sixth segment, the seventh segment, the eighth segment, and the ninth segment and the encoding order being the second segment, the first segment, the fifth segment, the third segment, the fourth segment, the sixth segment, the eighth segment, the seventh segment, and the ninth segment.

7. The apparatus of claim 1, wherein the segments of the image do not contain overlapping image content.

8. One or more non-transitory machine-readable storage media comprising machine-readable instructions that, when executed, cause one or more processors to at least:
  arrange a set of image regions in a non-scan line order;
  encode the image regions in the non-scan line order such that 1) a center image region of the set of image regions is encoded earlier than the center image region would be encoded in a scan line order, and 2) a peripheral image region of the set of image regions is encoded later than the peripheral image region would be encoded in the scan line order; and
  supply, in the non-scan line order, the encoded image regions to a transmitter for transmission to a display unit.

9. The one or more non-transitory machine-readable storage media of claim 8, wherein the peripheral image region is a first one of a plurality of peripheral regions, the plurality of peripheral regions corresponding to corners of an image.

10. The one or more non-transitory machine-readable storage media of claim 8, wherein, by encoding the image regions in the non-scan line order, the instructions cause a non-peripheral image region of the set of image regions to be encoded earlier than the non-peripheral image region would be encoded in the scan line order.

11. The one or more non-transitory machine-readable storage media of claim 8, wherein the instructions cause the one or more processors to:
  divide an image into non-overlapping image regions to form the set of image regions; and
  store the set of image regions in a queue.

12. The one or more non-transitory machine-readable storage media of claim 11, wherein to divide the image, the instructions cause the one or more processors to divide the image into a grid containing a top row, a bottom row and a middle row, a left column, a middle column and a right column, and the set of image regions includes nine image regions, a first image region being a left-most image region in the top row, a second image region being a middle image region in the top row, a third image region being a right-most image region in the top row, a fourth image region being a left-most image region in the middle row, a fifth image region being a middle image region in the middle row, a sixth image region being a right-most image region in the middle row, a seventh image region being a left-most image region in the bottom row, an eighth image region being a middle image region in the bottom row, a ninth image region being a right-most image region in the bottom row, and the non-scan line order includes the second image region in a first position, the first image region in a second position, the fifth image region in a third position, the third image region in a fourth position, the fourth image region in a fifth position, the sixth image region in a sixth position, the eighth image region in a seventh position, the seventh image region in an eighth position, and the ninth image region in a ninth position.

13. An apparatus to order a plurality of image tiles, the apparatus comprising:
  means to position the plurality of image tiles in a non-scan line order, the plurality of image tiles including a center image tile corresponding to the center of an image, the center image tile occupying an earlier encoding position in the non-scan line order than the center image tile occupies in a scan line order;
  means to encode the plurality of image tiles in the non-scan line order; and
  means to transmit the encoded image tiles, in the non-scan line order, to a display.

14. The apparatus of claim 13, wherein the non-scan line order is a first encoding order in which the center image tile having content corresponding to a center of the image is encoded and transmitted before the others of the plurality of image tiles are encoded and transmitted.

15. The apparatus of claim 13, wherein the non-scan line order is a second encoding order in which the center image tile having content corresponding to a center of the image occurs earlier than the center image tile occurs in the scan line order, and a peripheral image tile having content corresponding to a corner of the image occurs later than the peripheral image tile occurs in the scan line order.

16. The apparatus of claim 13, wherein the plurality of image tiles further includes a peripheral image tile corresponding to a periphery of the image, the peripheral image tile occupying a later encoding position in the non-scan line order than the peripheral image tile occupies in the scan line order.

17. The apparatus of claim 13, further including means to segment the image to form the plurality of image tiles.

18. The apparatus of claim 17, wherein the means to segment divides the image into a grid containing a top row, a bottom row and a middle row, a left column, a middle column and a right column, and the plurality of image tiles includes nine image tiles, a first image tile being a left-most image tile in the top row of the grid, a second image tile being a middle image tile in the top row, a third image tile being a right-most image tile in the top row, a fourth image tile being a left-most image tile in the middle row, a fifth image tile being a middle image tile in the middle row, a sixth image tile being a right-most image tile in the middle row, a seventh image tile being a left-most image tile in the bottom row, an eighth image tile being a middle image tile in the bottom row, a ninth image tile being a right-most image tile in the bottom row, the scan line order being the first image tile, the second image tile, the third image tile, the fourth image tile, the fifth image tile, the sixth image tile, the seventh image tile, the eighth image tile, and the ninth image tile, and the first enhanced encoding order being the second image tile, the first image tile, the fifth image tile, the third image tile, the fourth image tile, the sixth image tile, the eighth image tile, the seventh image tile, and the ninth image tile.

19. The apparatus of claim 13, wherein the image tiles do not contain overlapping image content.

20. The apparatus of claim 13, wherein the apparatus is included in a virtual reality console and the encoded image tiles are transmitted wirelessly.

21. A method to order a plurality of segments of an image for encoding and transmission to a display device, the method comprising:
  ordering the segments in an encoding order for encoding, the encoding order being different than a scan line order, such that a center segment of the plurality of segments is to occupy a first position in the encoding order, the first position is to precede a second position occupied by the center segment in the scan line order, and the center segment corresponds to a center of the image;
  encoding the segments in the encoding order; and
  transmitting the encoded segments to the display device in the encoding order in which the encoded segments are encoded.

22. The method of claim 21, wherein the encoding order is such that a peripheral segment of the plurality of segments is to occupy a third position in the encoding order, the third position being at least one of 1) a same position occupied by the peripheral segment in the scan line order, or 2) after a fourth position occupied by the peripheral segment in the scan line order, the peripheral segment not sharing a border with the center segment.

23. The method of claim 22, wherein the peripheral segment is a first one of a plurality of peripheral segments, the plurality of peripheral segments corresponding to corners of the image.

24. The method of claim 22, wherein the encoding order is such that at least one non-peripheral segment of the plurality of segments is to occupy a fifth position in the encoding order, the fifth position preceding a sixth position occupied by the non-peripheral segment in the scan line order, the at least one non-peripheral segment sharing a border with the center segment.

25. The method of claim 21, further including:
dividing the image to form the plurality of segments; and
storing the segments in a queue in the scan line order.

26. The method of claim 25, wherein the dividing of the image to form the plurality of segments includes dividing the image into a grid containing a top row, a bottom row and a middle row, a left column, a middle column, and a right column, the plurality of segments includes nine segments, a first segment being a left-most segment in the top row, a second segment being a middle segment in the top row, a third segment being a right-most segment in the top row, a fourth segment being a left-most segment in the middle row, a fifth segment being a middle segment in the middle row, a sixth segment being a right-most segment in the middle row, a seventh segment being a left-most segment in the bottom row, an eighth segment being a middle segment in the bottom row, a ninth segment being a right-most segment in the bottom row, the scan line order being the first segment, the second segment, the third segment, the fourth segment, the fifth segment, the sixth segment, the seventh segment, the eighth segment, and the ninth segment and the encoding order being the second segment, the first segment, the fifth segment, the third segment, the fourth segment, the sixth segment, the eighth segment, the seventh segment, and the ninth segment.

27. The method of claim 21, wherein the segments of the image do not contain overlapping image content.

* * * * *